(12) United States Patent
Hatano et al.

(10) Patent No.: US 12,533,735 B2
(45) Date of Patent: Jan. 27, 2026

(54) CUTTING INSERT, CUTTING TOOL, AND METHOD FOR MANUFACTURING MACHINED PRODUCT

(71) Applicant: KYOCERA CORPORATION, Kyoto (JP)

(72) Inventors: Hirokazu Hatano, Otsu (JP); Kento Iwasaki, Yasu (JP)

(73) Assignee: KYOCERA CORPORATION, Kyoto (JP)

( * ) Notice: Subject to any disclaimer, the term of this patent is extended or adjusted under 35 U.S.C. 154(b) by 491 days.

(21) Appl. No.: 18/000,394

(22) PCT Filed: May 27, 2021

(86) PCT No.: PCT/JP2021/020213
§ 371 (c)(1),
(2) Date: Dec. 1, 2022

(87) PCT Pub. No.: WO2021/246283
PCT Pub. Date: Dec. 9, 2021

(65) Prior Publication Data
US 2023/0219150 A1    Jul. 13, 2023

(30) Foreign Application Priority Data
Jun. 3, 2020  (JP) ................ 2020-096644

(51) Int. Cl.
*B23C 5/10*   (2006.01)
*B23C 5/22*   (2006.01)
*B23C 5/20*   (2006.01)

(52) U.S. Cl.
CPC .............. *B23C 5/10* (2013.01); *B23C 5/22* (2013.01); *B23C 5/202* (2013.01); *B23C 2200/284* (2022.02); *B23C 2210/02* (2013.01)

(58) Field of Classification Search
CPC .... B23C 5/109; B23C 5/202; B23C 2200/287; B23C 2200/125; B23C 2200/284; B23C 5/10; B23C 5/22; B23C 2210/02
See application file for complete search history.

(56) References Cited

U.S. PATENT DOCUMENTS

| 7,670,088 B2 * | 3/2010 | Andersson | B23C 5/2208 407/66 |
| 8,475,089 B2 * | 7/2013 | Kakai | B23C 5/202 407/103 |

(Continued)

FOREIGN PATENT DOCUMENTS

| DE | 102016109867 A1 * | 1/2017 | ........... B23C 5/2204 |
| JP | 2007125669 A | 5/2007 | |

(Continued)

*Primary Examiner* — Sara Addisu
(74) *Attorney, Agent, or Firm* — HAUPTMAN HAM, LLP

(57) ABSTRACT

A cutting insert in a non-limiting aspect of the present disclosure may include an upper surface having a polygonal shape and including a first side, a lower surface, and a lateral surface. The lateral surface may include a first lateral surface located between the first side and the lower surface. The first lateral surface may include a first region that is flat. The first region may include a first central region, a first upper region and a first lower region. The first upper region may be located closer to the upper surface than the first central region, and may have a larger width than the first central region. The first lower region may be located closer to the lower surface than the first central region, and may be a larger width than the first central region.

17 Claims, 20 Drawing Sheets

(56) References Cited

U.S. PATENT DOCUMENTS

| | | | |
|---|---|---|---|
| 10,245,659 B2* | 4/2019 | Mao | B23C 5/20 |
| 11,285,549 B2* | 3/2022 | Mihalik | B23C 5/06 |
| 11,453,074 B2* | 9/2022 | Andersson | B23C 5/202 |
| 11,583,942 B2* | 2/2023 | Passov | B23C 5/20 |
| 2005/0214081 A1* | 9/2005 | Satran | B23C 5/2213 407/113 |
| 2006/0045636 A1* | 3/2006 | Johnson | B23C 5/2213 407/42 |
| 2007/0104546 A1 | 5/2007 | Maeta et al. | |
| 2012/0039678 A1* | 2/2012 | Nguyen | B23C 5/109 407/113 |
| 2014/0212228 A1 | 7/2014 | Horiike et al. | |
| 2014/0234037 A1 | 8/2014 | Horiike et al. | |
| 2017/0014920 A1* | 1/2017 | Fang | B23C 5/08 |
| 2017/0320146 A1* | 11/2017 | Ahnfeldt | B23C 5/2213 |
| 2018/0257155 A1 | 9/2018 | Kitajima et al. | |
| 2020/0023446 A1* | 1/2020 | Lee | B23C 5/202 |
| 2021/0187634 A1* | 6/2021 | Yamamoto | B23C 5/06 |
| 2022/0105577 A1* | 4/2022 | Aso | B23C 5/109 |
| 2023/0211424 A1* | 7/2023 | Dufour | B23C 5/202 407/34 |
| 2023/0278115 A1* | 9/2023 | Kakai | B23C 5/109 407/113 |
| 2023/0294183 A1* | 9/2023 | Nishikoori | B23C 5/202 409/131 |
| 2024/0109138 A1* | 4/2024 | Kantojarvi | B23C 5/2213 |

FOREIGN PATENT DOCUMENTS

| | | | | |
|---|---|---|---|---|
| JP | 2008511464 A | | 4/2008 | |
| JP | 201391153 A | | 5/2013 | |
| JP | 2013535351 A | | 9/2013 | |
| JP | 201756552 A | | 3/2017 | |
| KR | 2010130041 A | * | 12/2010 | |
| WO | WO-2021193709 A1 | * | 9/2021 | B23C 5/109 |

* cited by examiner

CUTTING INSERT, CUTTING TOOL, AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2021/020213 filed on May 27, 2021, which claims priority to Japanese Patent Application No. 2020-096644, filed on Jun. 3, 2020, which is entirely incorporated herein by reference.

TECHNICAL FIELD

The present disclosure may generally relate to a cutting insert which is used in a cutting process of a workpiece, a cutting tool and a method for manufacturing machined product. Specifically, the present disclosure may relate to a cutting tool for use in a milling process.

BACKGROUND

Cutting inserts is discussed in, for example, Japanese Unexamined Patent Publication No. 2007-125669 (Patent Document 1), Japanese Unexamined Patent Publication No. 2008-511464 (Patent Document 2) and Japanese Unexamined Patent Publication No. 2017-056552 (Patent Document 3) as a cutting insert for use in a cutting process of a workpiece, such as metal. Each of the cutting inserts discussed in Patent Documents 1 to 3 may include an upper surface, a lower surface, a lateral surface, an upper cutting edge and a lower cutting edge. When attaching the cutting insert to a holder, a part of the lateral surface in the cutting insert may abut against the holder.

The cutting insert may be subjected to a cutting load while cutting out the workpiece. It may therefore be necessary to stably fix the cutting insert to the holder.

SUMMARY

A cutting insert in a non-limiting aspect of the present disclosure may include an upper surface, a lower surface, a lateral surface, an upper cutting edge and a lower cutting edge. The upper surface may have a polygonal shape and may include a first side. The lower surface may be located on a side opposite to the upper surface. The lateral surface may be located between the upper surface and the lower surface. The upper cutting edge may be located on an intersection of the upper surface and the lateral surface. The lower cutting edge may be located on an intersection of the lower surface and the lateral surface. An imaginary straight line passing through a center of the upper surface and a center of the lower surface may be a central axis. The lateral surface may include a first lateral surface located between the first side and the lower surface. The first lateral surface may have a convex shape in a cross section orthogonal to the central axis, and may include a first region that is flat, and a second region that is flat and inclined relative to the first region. The first region may include a first central region, a first upper region and a first lower region. The first upper region may be located closer to the upper surface than the first central region, and may be a larger width in a direction orthogonal to the central axis than the first central region. The first lower region may be located closer to the lower surface than the first central region, and may be a larger width in a direction orthogonal to the central axis than the first central region.

EMBODIMENTS

<Cutting Inserts>

Figure 1:
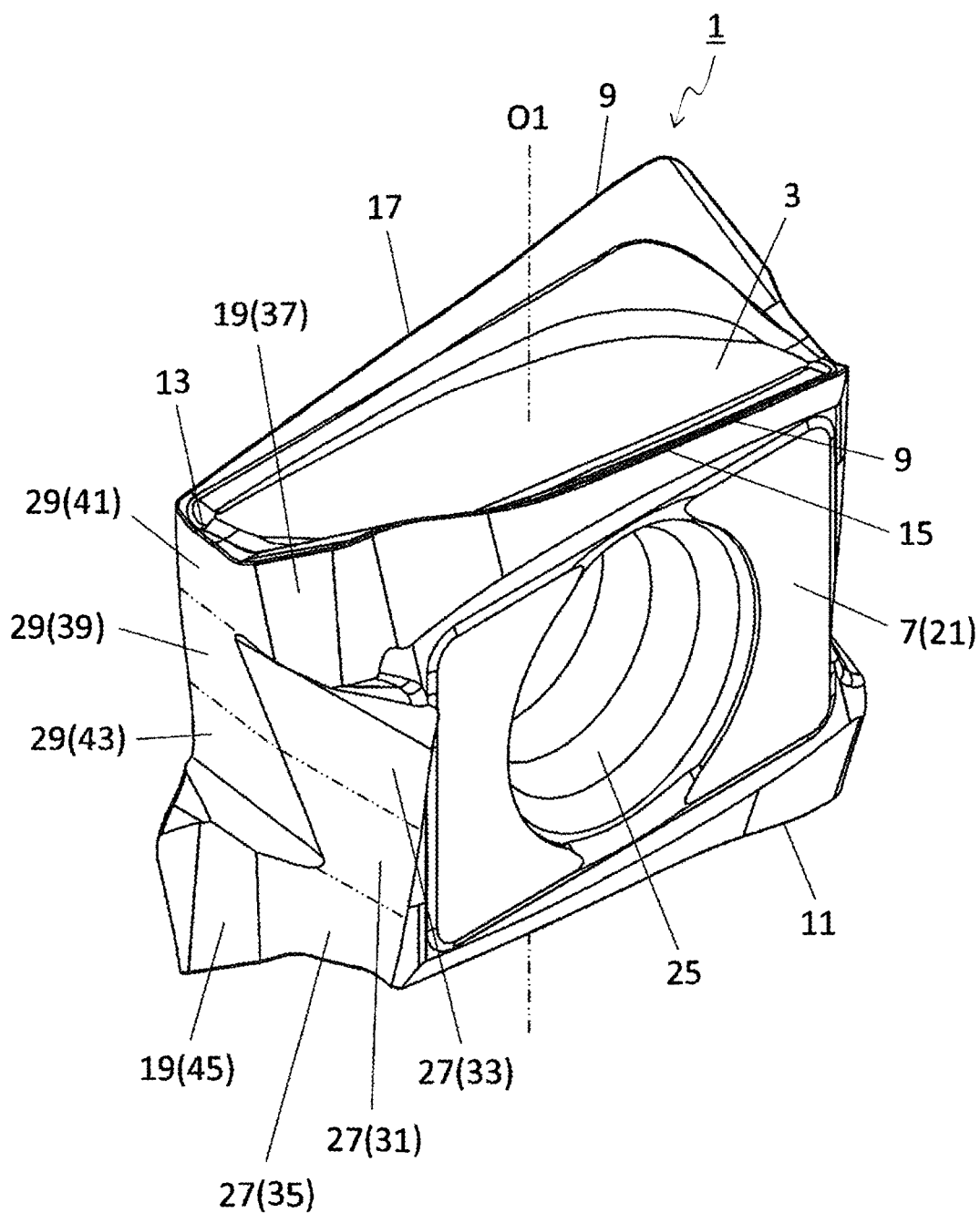
FIG. 1 is a perspective view illustrating a cutting insert in a non-limiting embodiment of the present disclosure.
Figure 2:
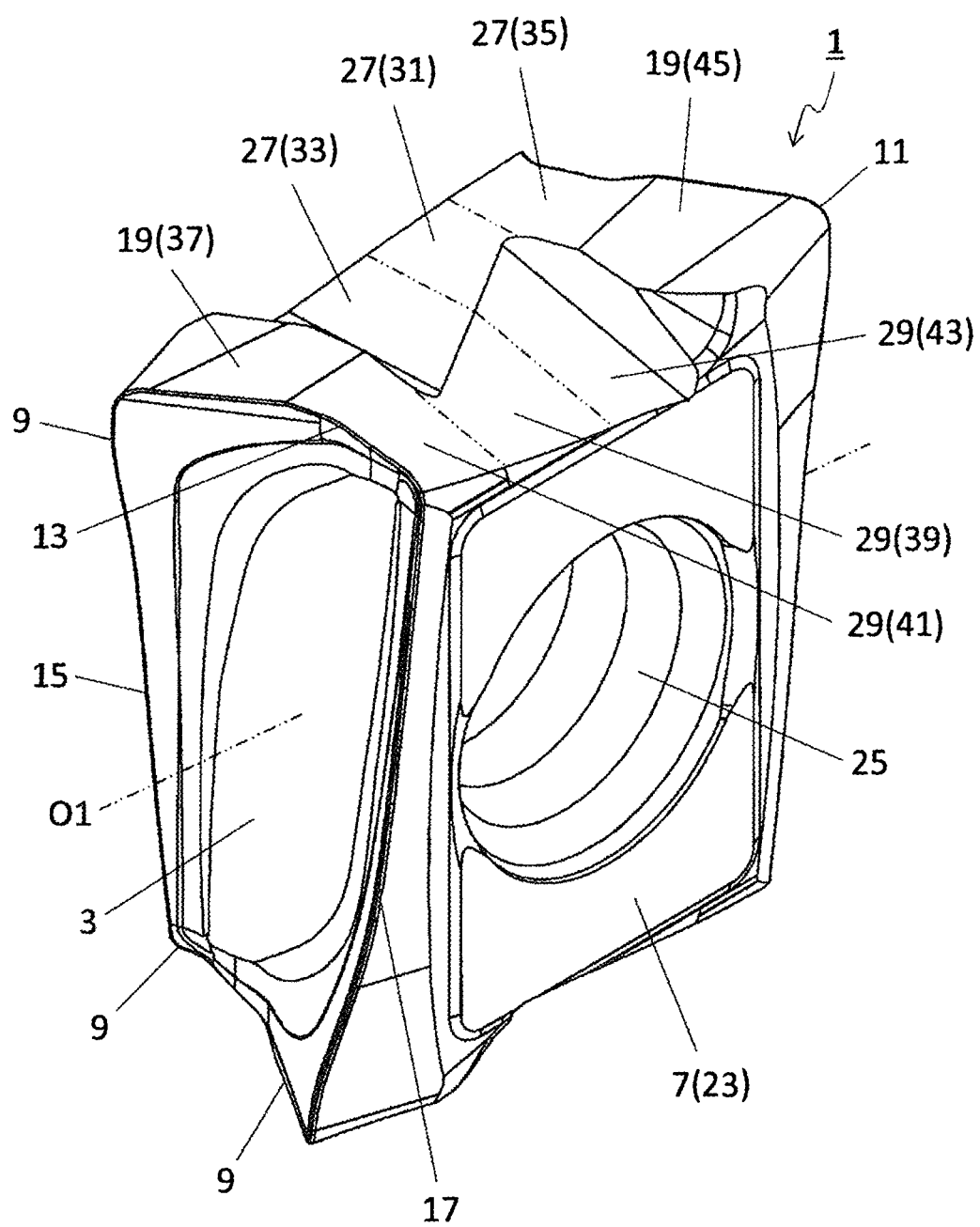
FIG. 2 is a perspective view of the cutting insert illustrated in FIG. 1 as viewed from a different direction.
Figure 3:
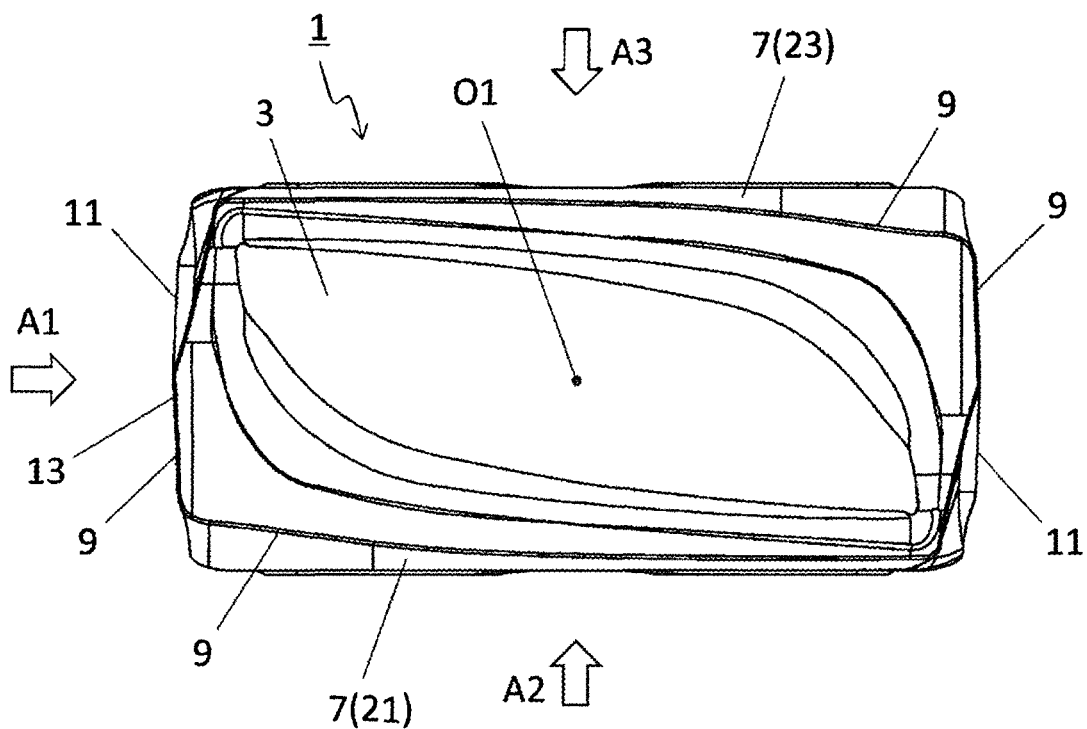
FIG. 3 is a top view of the cutting insert illustrated in FIG. 1 as viewed from above.
Figure 4:
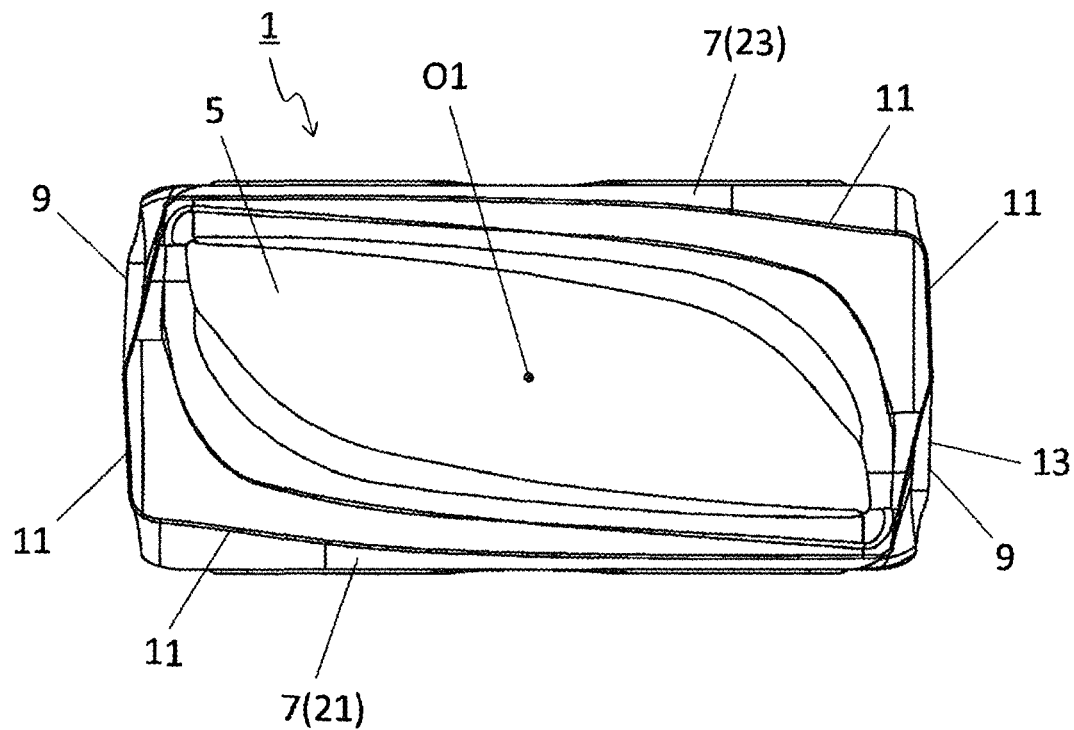
FIG. 4 is a bottom view of the cutting insert illustrated in FIG. 1 as viewed from below.

The cutting insert 1 (hereinafter also referred to as "insert 1") in a non-limiting embodiment of the present disclosure may be described in detail below with reference to the drawings. For the convenience of description, the drawings referred to in the following may illustrate, in simplified form, only main members necessary for describing the embodiment. The insert 1 may therefore include any arbitrary structural member not illustrated in the drawings referred to. Dimensions of the members in each of the drawings may faithfully represent neither dimensions of actual structural members nor dimensional ratios of these members.

The insert 1 may include an upper surface 3, a lower surface 5, a lateral surface 7, an upper cutting edge 9 and a lower cutting edge 11 as in the non-limiting embodiment illustrated in FIGS. 1 to 15. As used herein, the terms "the upper surface 3" and "the lower surface 5" may be used for the sake of convenience and do not respectively indicate upper and lower directions. For example, the upper surface 3 need not be directed upward when using the insert 1. These points may also be true for other parts names including the term "upper" or "lower."

The upper surface 3 may have a polygonal shape. The lower surface 5 may be located on a side opposite to the upper surface 3. Similarly to the upper surface 3, the lower surface 5 may have a polygonal shape. The insert 1 may have a polygonal plate shape.

Examples of the polygonal shape may include triangle, square, pentagon, hexagon and octagon. For example, the upper surface 3 may have a rectangular shape as in the non-limiting embodiment illustrated in FIG. 1. As used herein, the term "polygonal shape" need not be a strict polygonal shape. For example, a plurality of sides on the upper surface 3 may not be individually a strict straight line, but may be curved in a front view (top view) of the upper surface 3. A plurality of corners of the upper surface 3, which are respectively located between adjacent sides, may not be a strict corner. In other words, the plurality of corners on the upper surface 3 may not be a strict corner. These corners may have a convex curvilinear shape, or a combined shape made up of a straight line and a curved line as viewed from above. These points may also be true for the lower surface 5.

An imaginary straight line passing through a center of the upper surface 3 and a center of the lower surface 5 may be a central axis O1 of the insert 1. If the upper surface 3 has a polygonal shape, corners located at opposite corners on the upper surface 3 may be individually connected by a straight line, and a point of intersection of these straight lines may be the center of the upper surface 3. A starting point of a diagonal may be a portion where extension lines of the individual sides constituting the polygonal shape intersect with each other. A centroid position of the upper surface 3 as viewed from above may be the center of the upper surface 3. The center of the lower surface 5 may be defined similarly to the center of the upper surface 3. The upper surface 3 may have 180° rotational symmetry around the central axis O1 as viewed from above. The lower surface 5 may have 180° rotational symmetry around the central axis O1 if the lower surface 5 is viewed from the front (from below).

The insert 1 is not limited to a specific size. For example, a maximum width of the insert 1 if the upper surface 3 is viewed from above may be set to approximately 4-25 mm. A height from the upper surface 3 to the lower surface 5 may be set to approximately 5-20 mm. The height from the upper surface 3 to the lower surface 5 may denote a maximum value of a distance between the upper surface 3 and the lower surface 5 in a direction parallel to the central axis O1. The height from the upper surface 3 to the lower surface 5 may be rephrased as a width of the lateral surface 7 in the direction along the central axis O1.

The lateral surface 7 may be located between the upper surface 3 and the lower surface 5. The lateral surface 7 may connect to the upper surface 3 and the lower surface 5 as in the non-limiting embodiment illustrated in FIGS. 7 and 8.

The upper cutting edge 9 may be located on an intersection of the upper surface 3 and the lateral surface 7. The upper cutting edge 9 is usable for cutting out a workpiece if a machined product is manufactured using the insert 1.

The upper cutting edge 9 may be located on the whole or a part of the intersection. The upper cutting edge 9 may have a straight line shape or a curvilinear shape as viewed from the front (the side) of the lateral surface 7 or as viewed from above. Alternatively, the upper cutting edge 9 may have a combined shape made up of a straight line and a curved line as viewed from the side or as viewed from above.

If the insert 1 includes the upper cutting edge 9, one of the upper surface 3 and the lateral surface 7 may include a rake surface region, and the other of the upper surface 3 and the lateral surface 7 may include a flank surface region. The upper surface 3 may include the rake surface region, and the lateral surface 7 may include the flank surface region as in the non-limiting embodiment illustrated in FIG. 1.

The lower cutting edge 11 may be located on an intersection of the lower surface 5 and the lateral surface 7. Similarly to the upper cutting edge 9, the lower cutting edge 11 is usable for cutting out a workpiece if a machined product is manufactured using the insert 1.

The lower cutting edge 11 may be located on the whole or a part of the intersection. The lower cutting edge 11 may have a straight line shape or a curvilinear shape as viewed from the side or as viewed from below. Alternatively, the lower cutting edge 11 may have a combined shape made up of a straight line and a curved line as viewed from the side or as viewed from below. If the insert 1 includes the upper cutting edge 9 and the lower cutting edge 11, the insert 1 is servable as a double-sided insert.

The plurality of sides on the upper surface 3 may include a first side 13. That is, the upper surface 3 may include the first side 13. The plurality of the sides on the upper surface 3 may further include a second side 15 and a third side 17. Specifically, the upper surface 3 may include the second side 15 adjacent to one end portion of the first side 13, and the third side 17 adjacent to the other end portion of the first side 13. The first side 13, the second side 15 and the third side 17 may be identical or different in length. For example, each of the second side 15 and the third side 17 may have a larger length than the first side 13 as in the non-limiting embodiment illustrated in FIG. 1. The second side 15 and the third side 17 may be identical in length. The first side 13 may be one of short sides on the upper surface 3 having a rectangular shape. Each of the second side 15 and the third side 17 may be one of long sides on the upper surface 3 having the rectangular shape.

The lateral surface 7 may include a first lateral surface 19. The first lateral surface 19 may be located between the first side 13 and the lower surface 5. The lateral surface 7 may further include a second lateral surface 21 and a third lateral surface 23. Specifically, the lateral surface 7 may include the second lateral surface 21 located between the second side 15 and the lower surface 5, and the third lateral surface 23 located between the third side 17 and the lower surface 5.

The insert 1 may include a through hole 25 that opens into a center of the second lateral surface 21 and a center of the third lateral surface 23. The through hole 25 is usable for inserting, for example, a screw when fixing the insert 1 to a holder. Instead of the screw, for example, a clamping member may be used to fix the insert 1 to the holder.

An imaginary straight line passing through the center of the second lateral surface 21 and the center of the third lateral surface 23 may be a central axis O2 of the through hole 25. The central axis O2 of the through hole 25 may be orthogonal to the central axis O1 of the insert 1. The term "being orthogonal" is not limited to being strictly orthogonal, but may denote that a range of approximately 90±5° is permissible. The center of the second lateral surface 21 and the center of the third lateral surface 23 may be defined similarly to the center of the upper surface 3.

Figure 11:
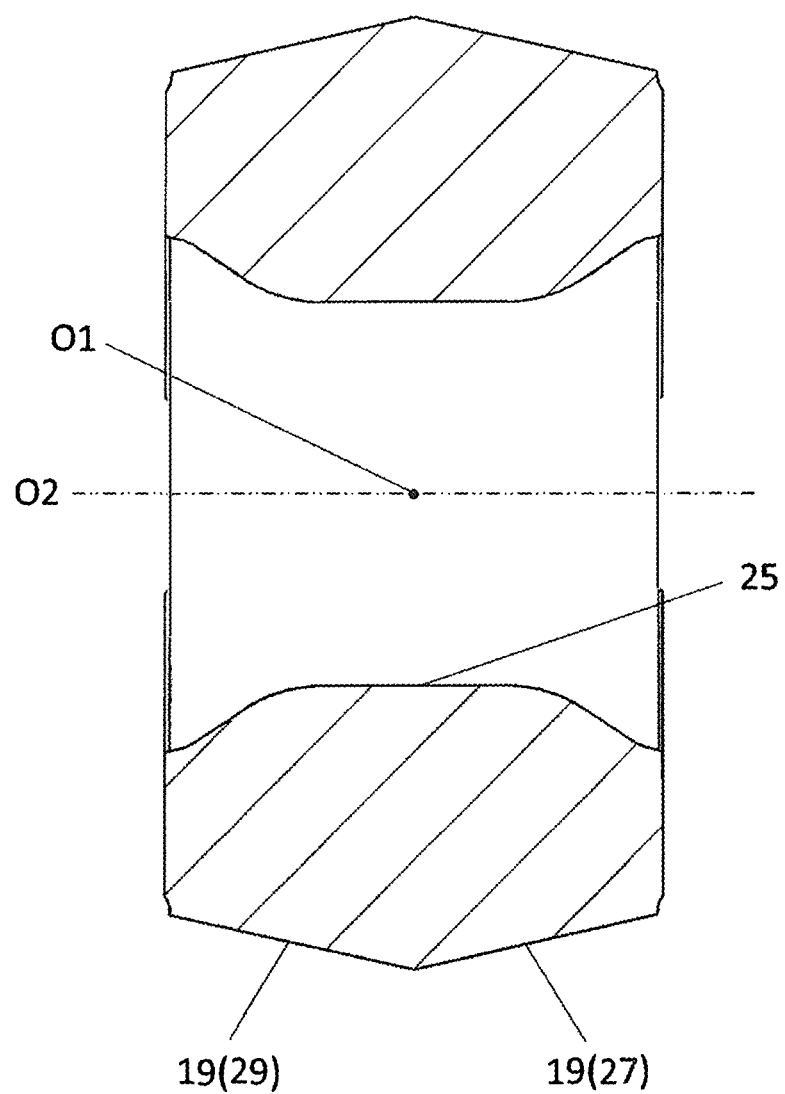
FIG. 11 is a cross-sectional view of the cutting insert taken along line XI-XI in FIG. 9.
Figure 12:
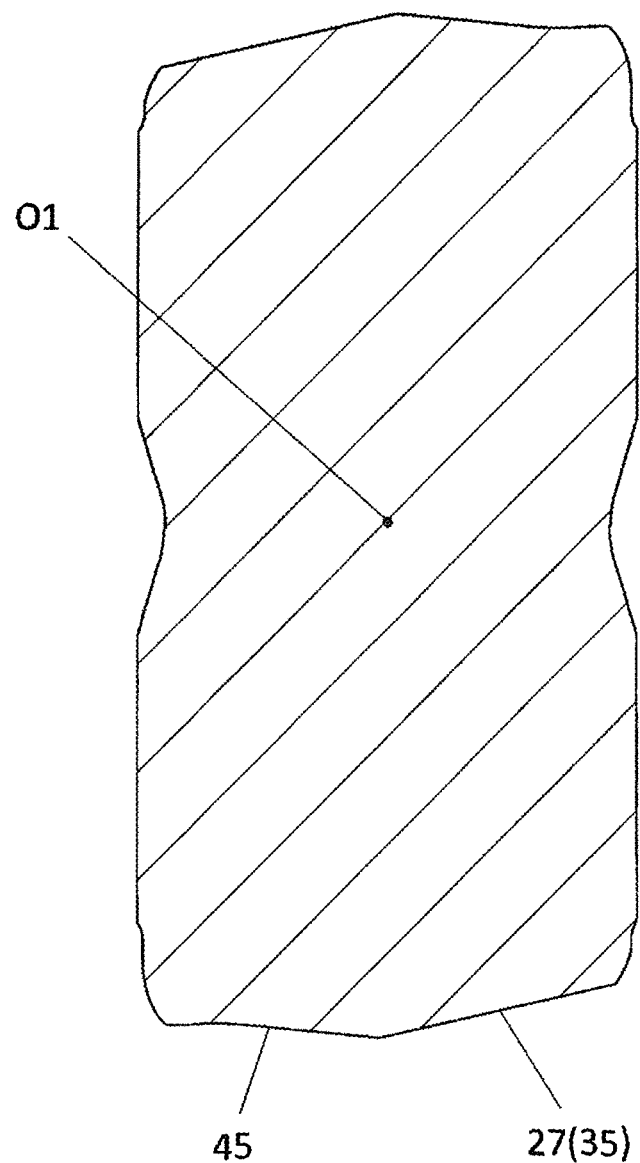
FIG. 12 is a cross-sectional view of the cutting insert taken along line XII-XII in FIG. 9.
Figure 13:
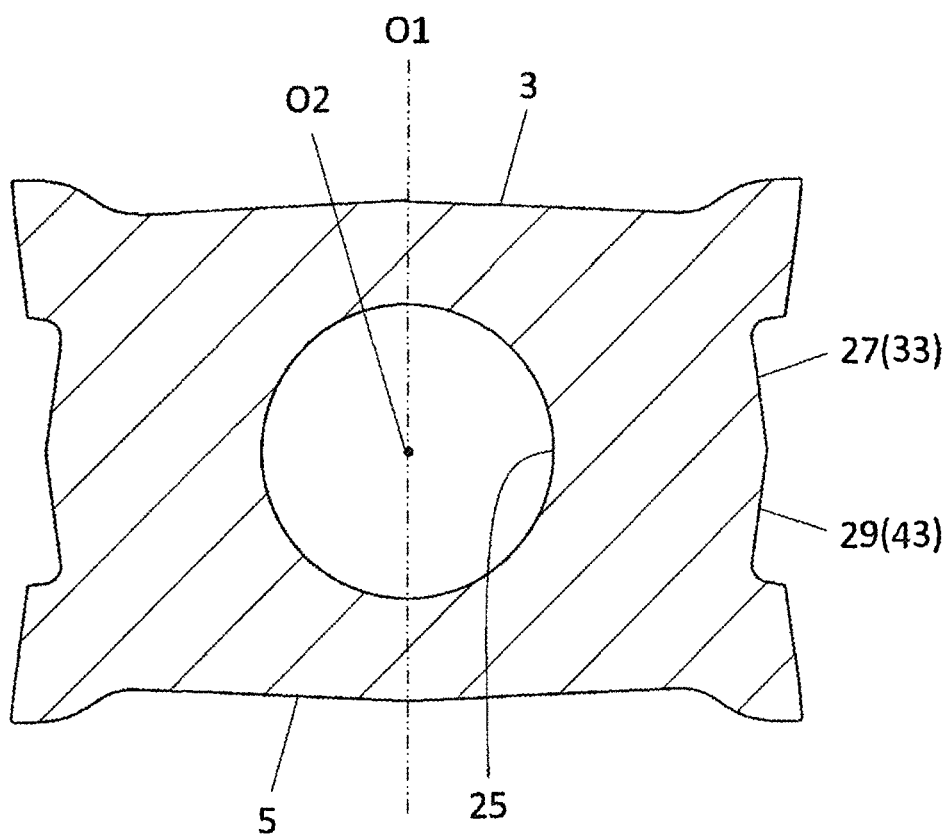
FIG. 13 is a cross-sectional view of the cutting insert taken along line XIII-XIII in FIG. 9.
Figure 14:
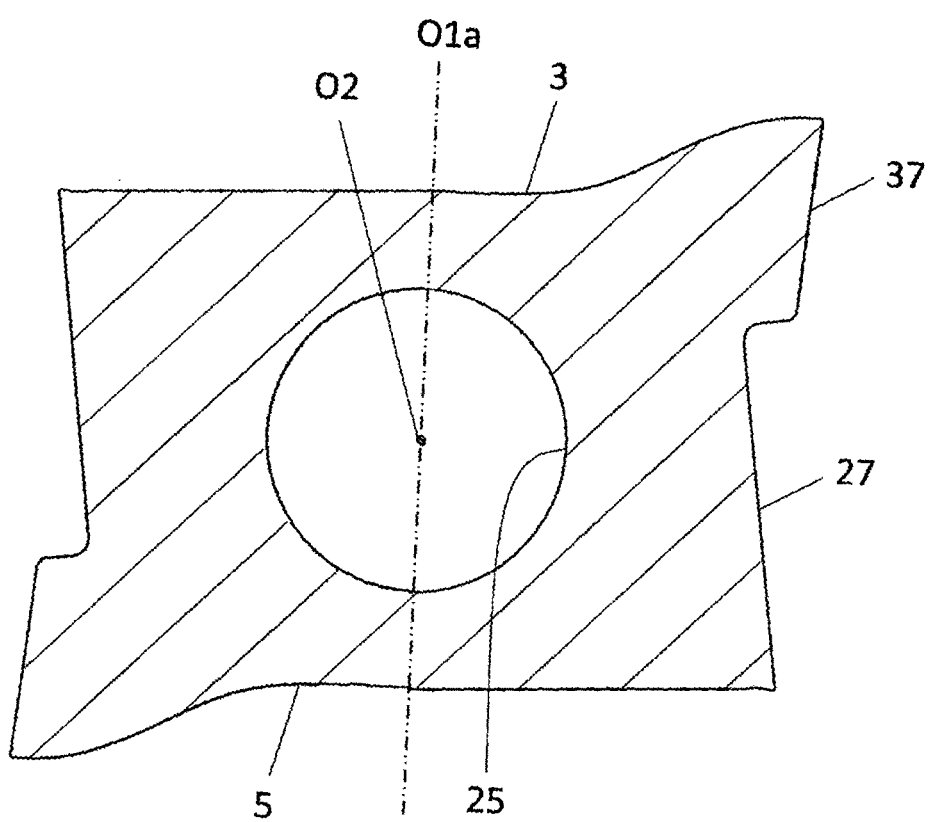
FIG. 14 is a cross-sectional view of the cutting insert taken along line XIV-XIV in FIG. 9.
Figure 15:
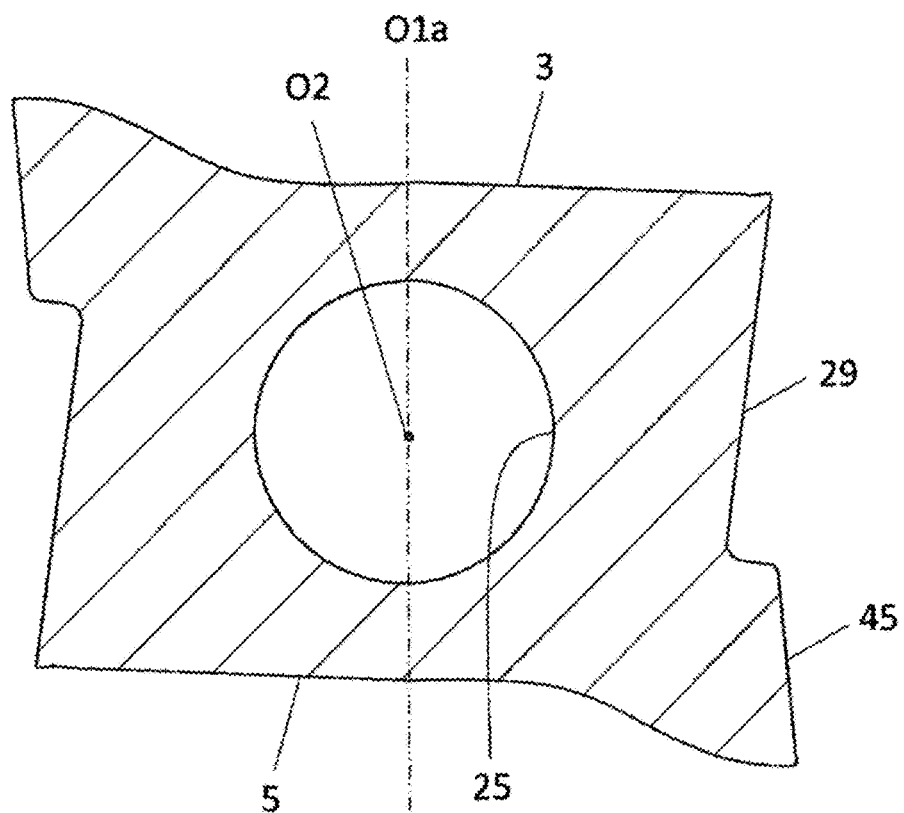
FIG. 15 is a cross-sectional view of the cutting insert taken along line XV-XV in FIG. 9.

The first lateral surface 19 may have a convex shape in a cross section orthogonal to the central axis O1 as in the non-limiting embodiment illustrated in FIG. 11. The first lateral surface 19 may include a first region 27 that is flat, and a second region 29 that is flat and inclined relative to the first region 27. The first region 27 and the second region 29 are usable as a so-called constraining surface when attaching the insert 1 to the holder. The second region 29 may include a part thereof adjacent to the first region 27 in a direction orthogonal to the central axis O1.

The first region 27 and the second region 29 need not be strictly flat. The first region 27 and the second region 29 may be an approximately flat region, and may be slightly curved or may have small irregularities to such a degree that cannot be seen if the insert 1 is viewed as a whole. For example, the first region 27 and the second region 29 may include small irregularities of approximately several tens of μm.

Figure 5:
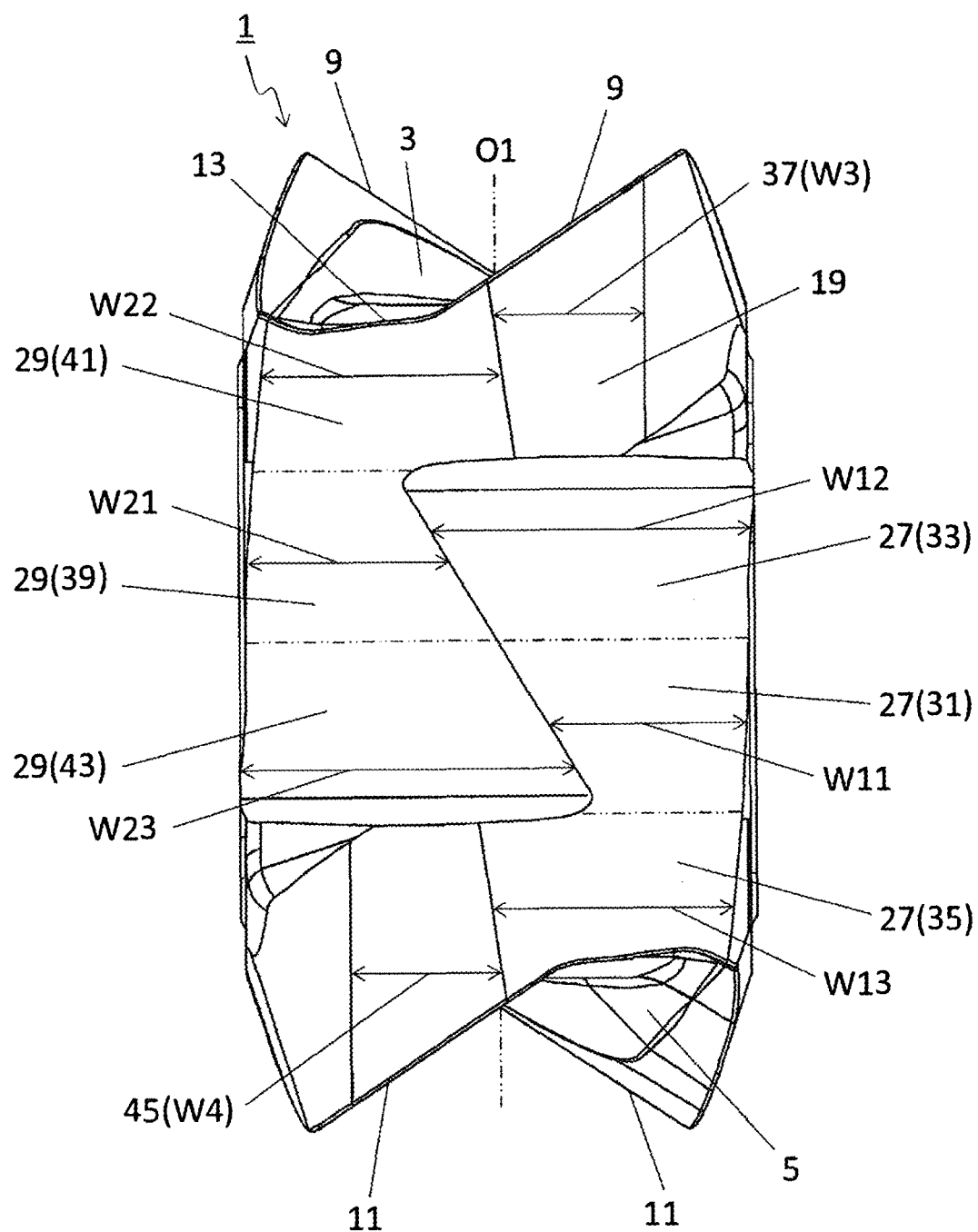
FIG. 5 is a side view of the cutting insert illustrated in FIG. 3 as viewed from an A1 direction.

The first region 27 may includes a first central region 31, a first upper region 33 and a first lower region 35 as in the non-limiting embodiment illustrated in FIG. 5.

The first upper region 33 may be located closer to the upper surface 3 than the first central region 31. In other words, the first upper region 33 may be located between the first central region 31 and the upper surface 3. The first upper region 33 may have a larger width in a direction orthogonal to the central axis O1 than the first central region 31. Specifically, a width W12 of the first upper region 33 in the direction orthogonal to the central axis O1 may be larger than a width W11 of the first central region 31 in the direction orthogonal to the central axis O1. A magnitude relationship of width may be evaluated by comparing maximum values of the widths.

The first lower region 35 may be located closer to the lower surface 5 than the first central region 31. In other words, the first lower region 35 may be located between the first central region 31 and the lower surface 5. The first lower region 35 may have a larger width in a direction orthogonal to the central axis O1 than the first central region 31. Specifically, a width W13 of the first lower region 35 in the direction orthogonal to the central axis O1 may be larger than the width W11 of the first central region 31 in the direction orthogonal to the central axis O1.

An imaginary plane that is orthogonal to the central axis O1 and is located between the upper surface 3 and the lower surface 5 may be referred to as "a plane S." The plane S may include the central axis O2. The first upper region 33 may be located between the plane S and the upper surface 3. The first central region 31 and the first lower region 35 may be located between the plane S and the lower surface 5. The first central region 31 and the first lower region 35 may be identical in width in a direction along the central axis O1. That is, a line which passes through an intermediate point in the direction along the central axis O1 in between the plane S and a lower end of the first region 27, and which is orthogonal to the central axis O1 may be a boundary 57 between the first central region 31 and the first lower region 35.

In cases where the width W12 of the first upper region 33 is larger than the width W11 of the first central region 31 if the first region 27 is used as a constraining surface, it may be easy to stably constrain the insert 1 onto the holder. If a workpiece is cut out using the first region 27 as the constraining surface, the insert 1 may be subjected to a force to cause rotation around the central axis O2 of the through hole 25, for example, due to a cutting force. However, it may be easy to stably constrain the insert 1 on the first upper region 33 even if subjected to the force.

In cases where the width W13 of the first lower region 35 is larger than the width W11 of the first central region 31 if the first region 27 is used as a constraining surface, it may be easy to stably constrain the insert 1 onto the holder. If a workpiece is cut out using the first region 27 as a constraining surface, the insert 1 may be subjected to, for example, a thrust force generated by the lower cutting edge 11.

The first lower region 35, which is located close to the lower surface 5, may tend to easily receive the thrust force. Hence, even if subjected to the thrust force, the first lower region 35 having the large width W13 may tend to stably receive the thrust force. This may facilitate stable constraining of the insert 1.

Further, the width of the first region 27 in a direction orthogonal to the central axis O1 may not be large over the whole thereof, but the width W11 of the first central region 31 may be relatively small. It may therefore be also possible to keep a width of the second region 29 in the direction orthogonal to the central axis O1. This may facilitate stable constraining of the insert 1 onto the holder if the workpiece is cut out using the second region 29 as a constraining surface.

The first central region 31 may connect to or may be located away from the first upper region 33. The first central region 31 may connect to or may be located away from the first lower region 35. For example, the first central region 31 may connect to each of the first upper region 33 and the first lower region 35 as in the non-limiting embodiment illustrated in FIG. 5.

A maximum value of the width W12 of the first upper region 33 in a direction orthogonal to the central axis O1 may be equal to or different from a maximum value of the width W13 of the first lower region 35 in the direction orthogonal to the central axis O1. For example, the maximum value of the width W12 may be larger than the maximum value of the width W13 as in the non-limiting embodiment illustrated in FIG. 5. This may offer enhanced effects of relaxing stress concentration at the holder occurred in a cutting process.

The width W11, the width W12 and the width W13 may be kept constant or changed. For example, as in the non-limiting embodiment illustrated in FIG. 5, the first central region 31 may include a part thereof whose width W11 becomes larger as coming closer to the upper surface 3. The width W11 may have a maximum value at an end portion on a side of the upper surface 3 in the first central region 31. The first upper region 33 may include a part thereof whose width W12 becomes larger as coming closer to the upper surface 3. The width W12 may have a maximum value at an end portion on a side of the upper surface 3 in the first upper region 33. The first lower region 35 may include a part thereof whose width W13 becomes larger as coming closer to the upper surface 3. The width W13 may have a maximum value at an end portion on a side of the upper surface 3 in the first lower region 35.

The first lateral surface 19 may further include a first flank surface 37. The first flank surface 37 may be located between the first region 27 and the upper surface 3. The first region 27 may be located closer to the central axis O1 than the first flank surface 37 in a cross section along the central axis O1 as in the non-limiting embodiment illustrated in FIG. 14.

With this configuration, a small distance from the central axis O1 to the first region 27 may contribute to decreasing the force to rotate the insert 1 in a cutting process, thus leading to more stable constraining. A positional relationship with the central axis O1 may be evaluated on the basis of an imaginary straight line O1a located inside the insert 1 and parallel to the central axis O1.

The first region 27 may be located closer to the central axis O1 as coming closer to the upper surface 3 in the cross section along the central axis O1. With this configuration, the insert 1 may be more likely to be drawn into a pocket of the holder in a cutting process, and therefore, the insert 1 may tend to be stably constrained by the holder.

The first region 27 may connect to or may be located away from the lower surface 5. If the first region 27 connects to the lower surface 5, a large area of the first region 27 may tend to be ensured. This may facilitate stable fixing of the insert 1 to the holder.

The second region 29 may include a second central region 39, a second upper region 41 and a second lower region 43 as in the non-limiting embodiment illustrated in FIG. 5.

The second upper region 41 may be located closer to the upper surface 3 than the second central region 39. In other words, the second upper region 41 may be located between the second central region 39 and the upper surface 3. The second upper region 41 may have a larger width in a direction orthogonal to the central axis O1 than the second central region 39. That is, a width W22 of the second upper region 41 in the direction orthogonal to the central axis O1 may be larger than a width W21 of the second central region 39 in the direction orthogonal to the central axis O1.

The second lower region 43 may be located closer to the lower surface 5 than the second central region 39. In other words, the second lower region 43 may be located between the second central region 39 and the lower surface 5. The second lower region 43 may have a larger width in a direction orthogonal to the central axis O1 than the second central region 39. That is, a width W23 of the second lower region 43 in the direction orthogonal to the central axis O1 may be larger than the width W21 of the second central region 39 in the direction orthogonal to the central axis O1.

The second lower region 43 may be located between the plane S and the lower surface 5. The second central region 39 and the second upper region 41 may be located between the plane S and the upper surface 3. The second central region 39 and the second upper region 41 may be identical in width in the direction along the central axis O1. That is, a line which passes through an intermediate point in the direction along the central axis O1 in between the plane S and an upper end of the second region 29, and which is orthogonal to the central axis O1 may be a boundary 53 between the second central region 39 and the second upper region 41.

In cases where the width W23 of the second lower region 43 is larger than the width W21 of the second central region 39 if the second region 29 is used as a constraining surface, it may be easy to stably constrain the insert 1 onto the holder. If a workpiece is cut out using the second region 29 as a constraining surface, the insert 1 may be subjected to a force to cause rotation around the central axis O2 of the through hole 25, for example, due to a cutting force. However, it may be easy to stably constrain the insert 1 on the second lower region 43 even if subjected to the force.

In cases where the width W22 of the second upper region 41 is larger than the width W21 of the second central region 39 if the second region 29 is used as a constraining surface, it may be easy to stably constrain the insert 1 onto the holder. If a workpiece is cut out using the second region 29 as a constraining surface, the insert 1 may be subjected to a thrust force generated, for example, by the upper cutting edge 9.

The second upper region 41, which is located close to the upper surface 3, may tend to easily receive the thrust force. Hence, even if subjected to the thrust force, the second upper region 41 having the large width W22 may tend to stably receive the thrust force. This may facilitate stable constraining of the insert 1.

Further, the width of the second region 29 in the direction orthogonal to the central axis O1 may not be large over the whole thereof, but the width W21 of the second central region 39 may be relatively small. It may therefore be also possible to keep a width of the first region 27 in the direction orthogonal to the central axis O1. This may facilitate the stable constraining of the insert 1 onto the holder even if the workpiece is cut out in a state where the first region 27 is used as a constraining surface.

The second central region 39 may connect to or may be located away from the second upper region 41. The second central region 39 may connect to or may be located away from the second lower region 43. For example, the second central region 39 may connect to each of the second upper region 41 and the second lower region 43 as in the non-limiting embodiment illustrated in FIG. 5.

A maximum value of the width W23 of the second lower region 43 in the direction orthogonal to the central axis O1 may be equal to or different from a maximum value of the width W22 of the second upper region 41 in the direction orthogonal to the central axis O1. For example, the maximum value of the width W23 may be larger than the maximum value of the width W22 as in the non-limiting embodiment illustrated in FIG. 5. This may offer enhanced effects of relaxing stress concentration at the holder occurred in a cutting process.

The width W21, the width W22 and the width W23 may be kept constant or changed. For example, the second central region 39 may include a part thereof whose width W21 becomes larger as coming closer to the lower surface 5 as in the non-limiting embodiment illustrated in FIG. 5. The width W21 may have a maximum value at an end portion on a side of the lower surface 5 in the second central region 39. The second upper region 41 may include a part thereof whose width W22 becomes larger as coming closer to the lower surface 5. The width W22 may have a maximum value at an end portion on a side of the lower surface 5 in the second upper region 41. The second lower region 43 may include a part thereof whose width W23 becomes larger as coming closer to the lower surface 5. The width W23 may have a maximum value at an end portion on a side of the lower surface 5 in the second lower region 43.

The first lateral surface 19 may further include a second flank surface 45. The second flank surface 45 may be located between the second region 29 and the lower surface 5. The second region 29 may be located closer to the central axis O1 than the second flank surface 45 in a cross section along the central axis O1 as in the non-limiting embodiment illustrated in FIG. 15. With these configurations, a small distance from the central axis O1 to the second region 29 may contribute to decreasing the force to rotate the insert 1 in a cutting process, thus leading to more stable constraining.

The second region 29 may be located closer to the central axis O1 as coming closer to the lower surface 5 in the cross section along the central axis O1. With this configuration, the insert 1 may be more likely to be drawn into the pocket of the holder in a cutting process, and therefore, the insert 1 may tend to be stably constrained by the holder.

The second region 29 may connect to or may be located away from the upper surface 3. If the second region 29 connects to the upper surface 3, a large area of the second region 29 may tend to be ensured. This may facilitate stable fixing of the insert 1 to the holder.

Figure 6:
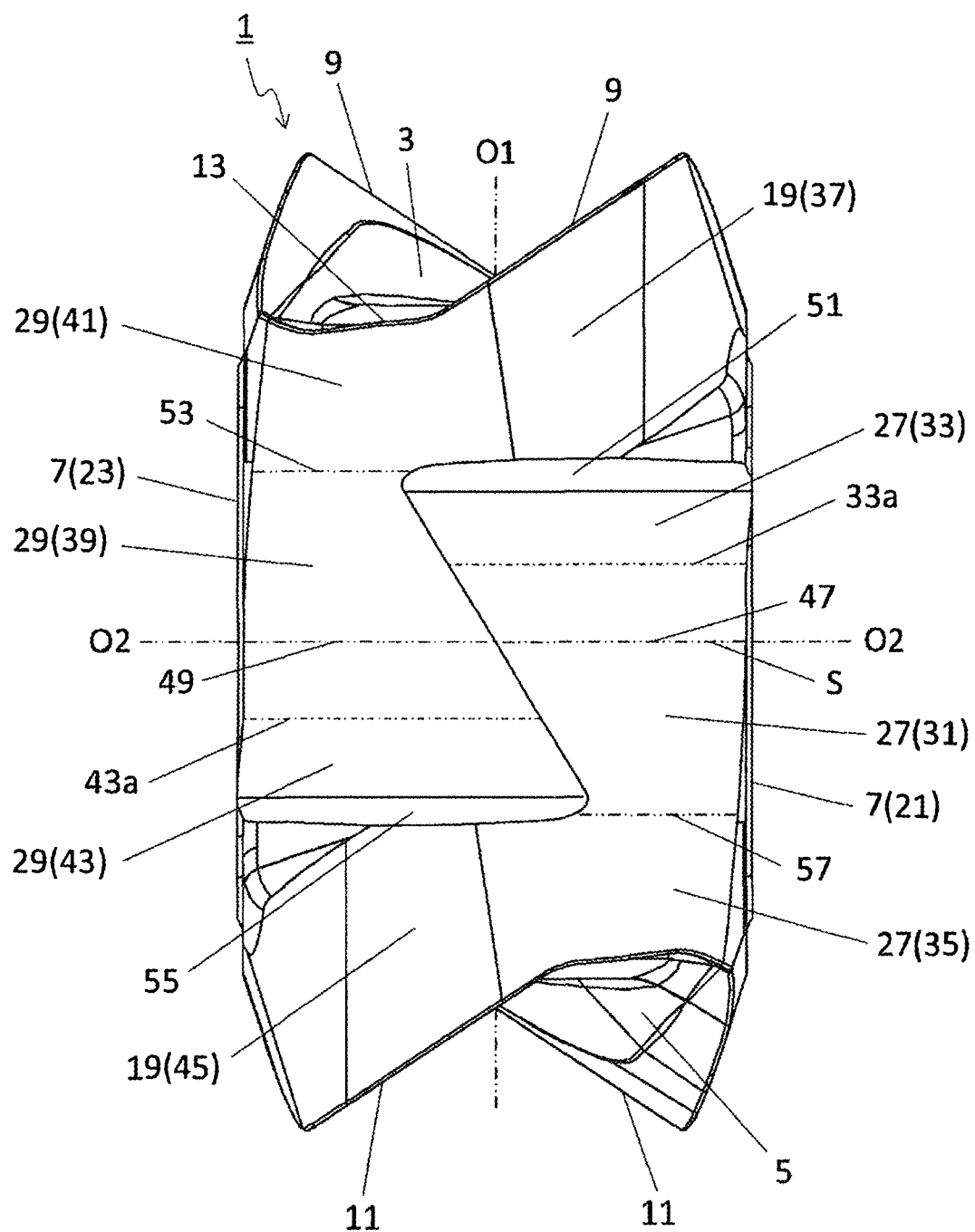
FIG. 6 is a side view similar to that of the cutting insert illustrated in FIG. 5.
Figure 7:
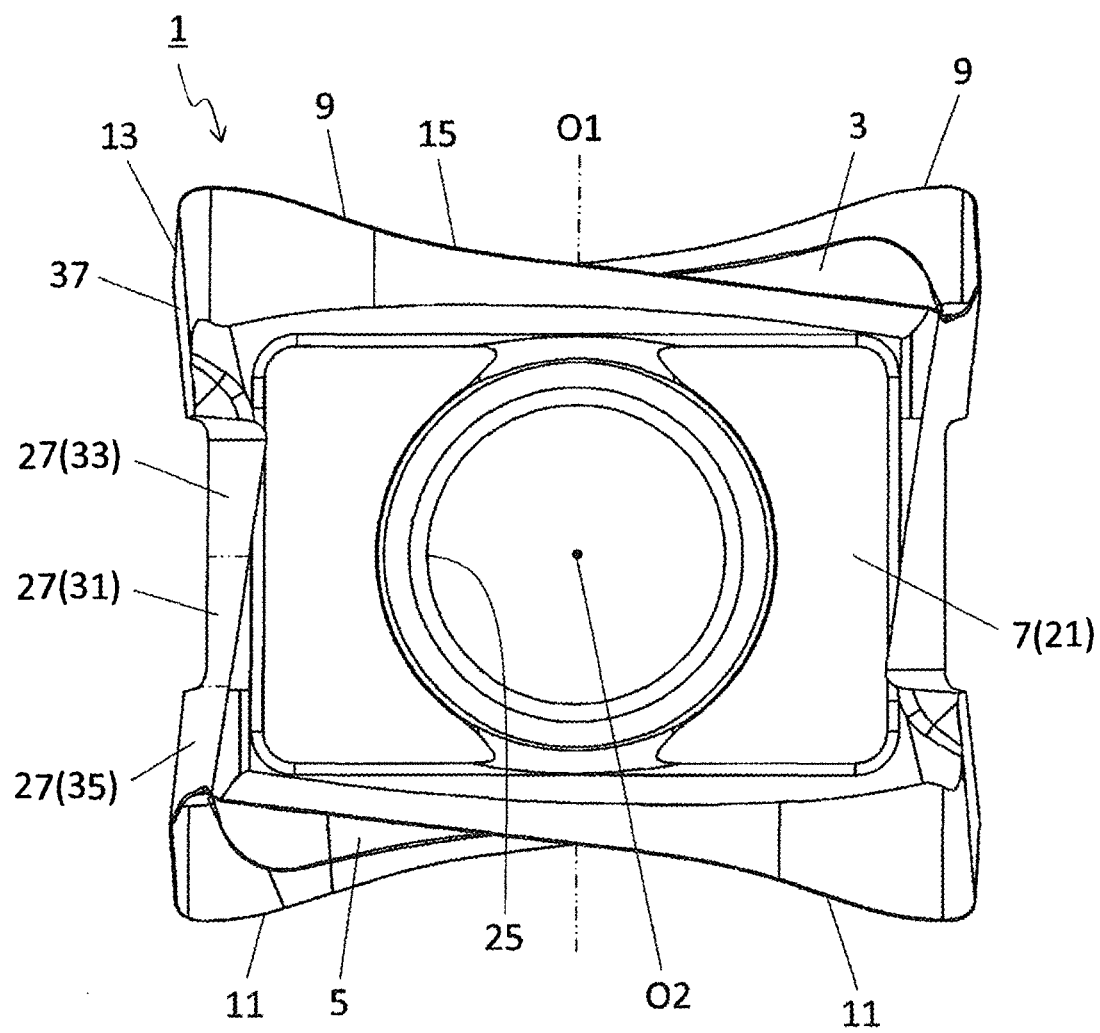
FIG. 7 is a side view of the cutting insert illustrated in FIG. 3 as viewed from an A2 direction.
Figure 8:
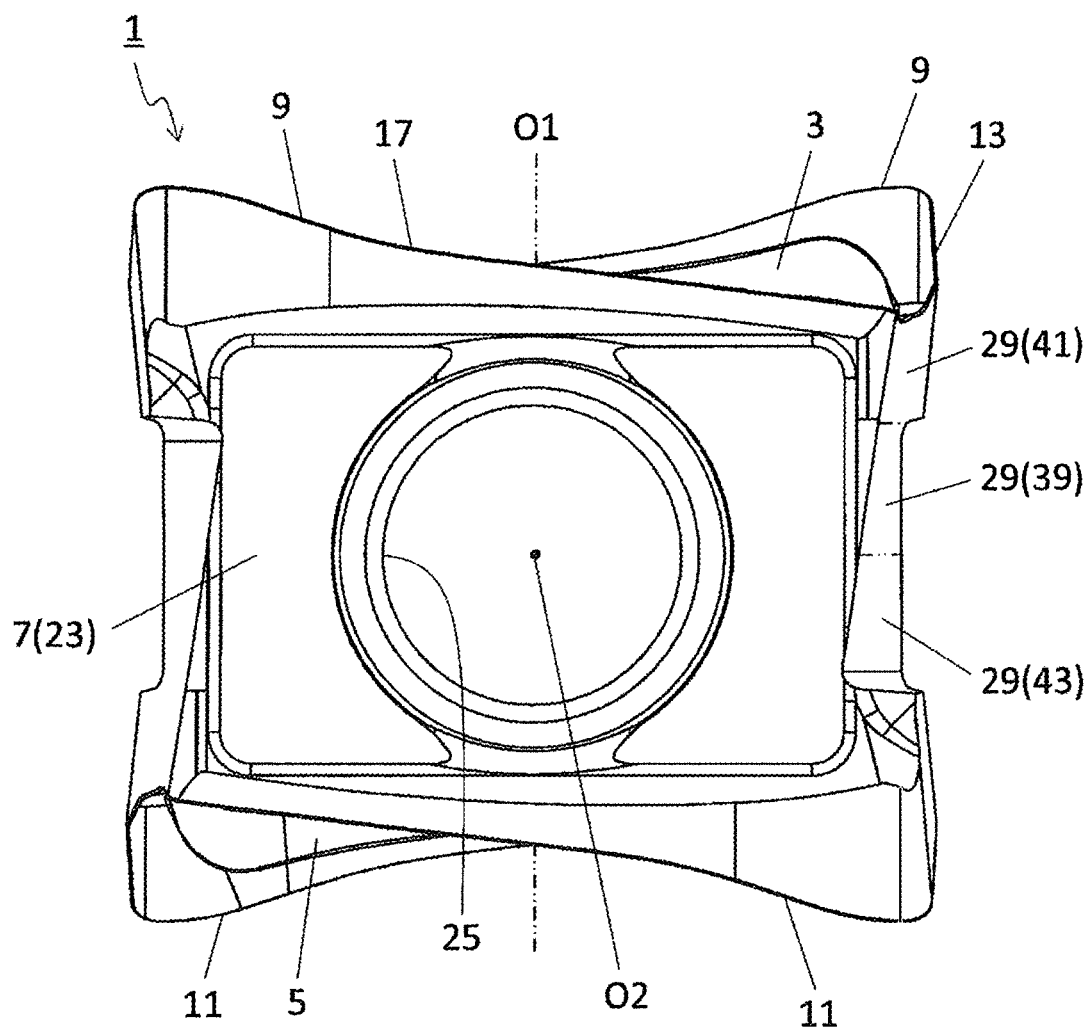
FIG. 8 is a side view of the cutting insert illustrated in FIG. 3 as viewed from an A3 direction.
Figure 9:
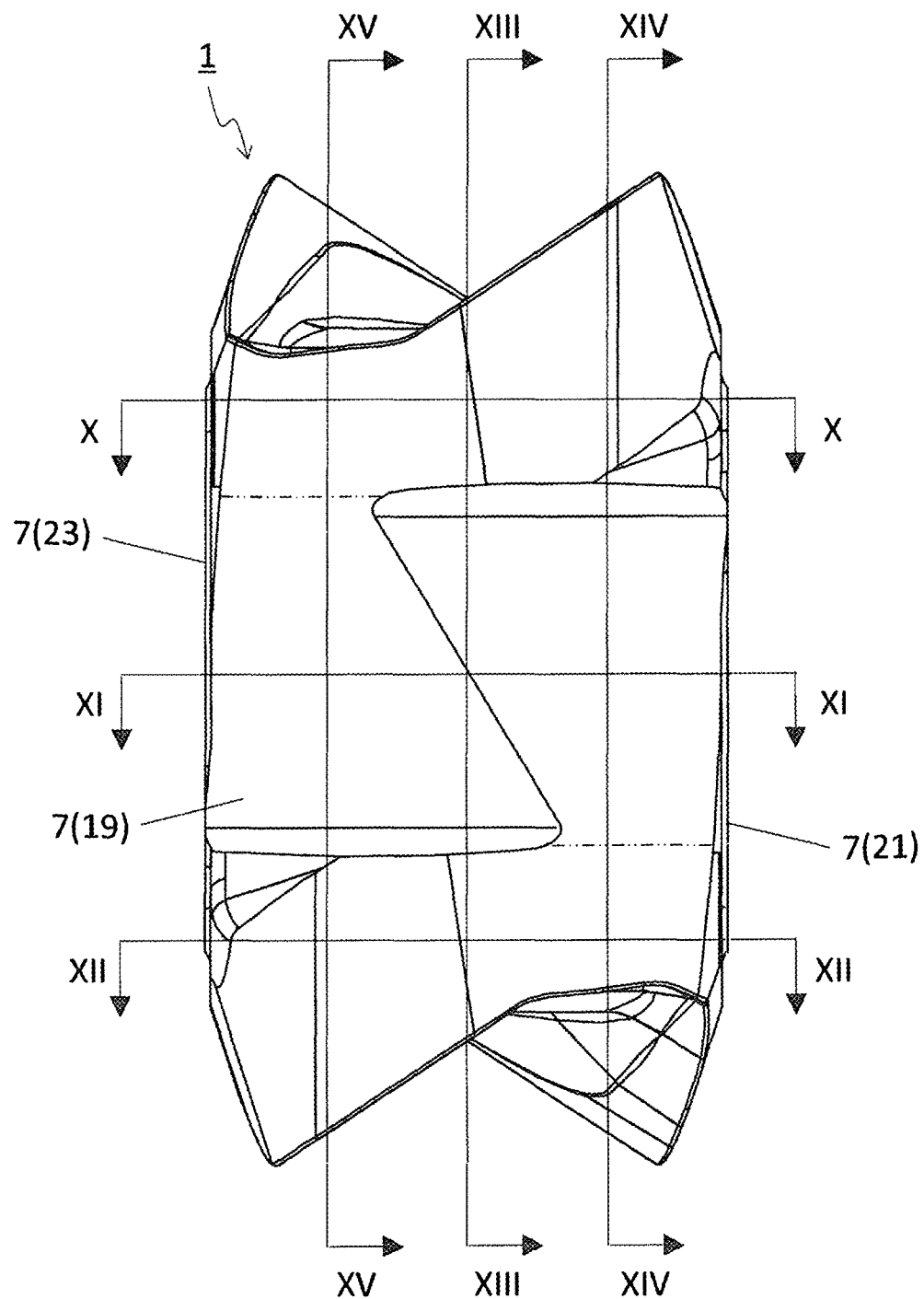
FIG. 9 is a side view similar to that of the cutting insert illustrated in FIG. 5.
Figure 10:
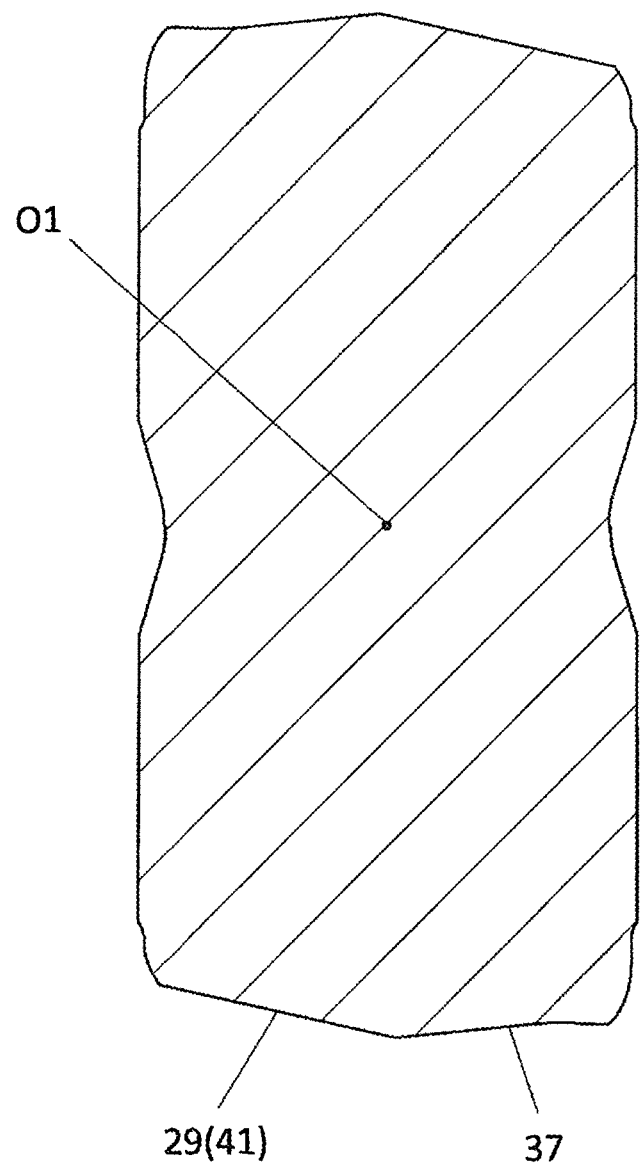
FIG. 10 is a cross-sectional view of the cutting insert taken along line X-X in FIG. 9.

The first upper region 33 may be adjacent to the second central region 39 in a direction orthogonal to the central axis O1 as in the non-limiting embodiment illustrated in FIG. 6. This may contribute to keeping a large width of the first upper region 33, thus leading to a larger range of the constraining surface. Therefore, the insert 1 may tend to be stably constrained by the holder. The above configuration may denote that a center 33a of the first upper region 33 in the direction along the central axis O1 is adjacent to the second central region 39 in the direction orthogonal to the central axis O1.

The second lower region 43 may be adjacent to the first central region 31 in the direction orthogonal to the central axis O1. This may contribute to keeping a large width of the second lower region 43, thus leading to a larger range of the constraining surface. Therefore, the insert 1 may tend to be stably constrained by the holder. The above configuration may denote that a center 43a of the second lower region 43 in the direction along the central axis O1 is adjacent to the first central region 31 in the direction orthogonal to the central axis O1.

The first upper region 33 may include a part thereof located closer to the third lateral surface 23 than the first flank surface 37 in the direction orthogonal to the central axis O1. Because the first upper region 33 is located closer to the third lateral surface 23 than the first flank surface 37 in this configuration, the insert 1 may be less likely to move from the holder toward an outer periphery in a cutting process, thus leading to stable constraining.

The second lower region 43 may include a part thereof located closer to the second lateral surface 21 than the second flank surface 45 in a direction orthogonal to the central axis O1. Because the second lower region 43 is located closer to the second lateral surface 21 than the second flank surface 45 in this configuration, the insert 1 may be less likely to move from the holder toward an outer periphery in a cutting process, thus leading to stable constraining.

The width W12 of the first upper region 33 in the direction orthogonal to the central axis O1 may be equal to or different from a width W3 in the direction orthogonal to the central axis O1 on the first flank surface 37. For example, the width W12 may be larger than the width W3 as in the non-limiting embodiment illustrated in FIG. 5.

The width W23 in the direction orthogonal to the central axis O1 on the second lower region 43 may be equal to or different from a width W4 of the second flank surface 45 in a direction orthogonal to the central axis O1. For example, the width W23 may be larger than the width W4 as in the non-limiting embodiment illustrated in FIG. 5.

The first central region 31, the first upper region 33 and the first lower region 35 may be identical or different in area. For example, the first central region 31 may have a smaller area than each of the first upper region 33 and the first lower region 35 as in the non-limiting embodiment illustrated in FIG. 5. The first upper region 33 may have a larger area than the first lower region 35.

The second central region 39, the second upper region 41 and the second lower region 43 may be identical or different in area. For example, the second central region 39 may have a smaller area than each of the second upper region 41 and the second lower region 43 as in the non-limiting embodiment illustrated in FIG. 5. The second lower region 43 may have a larger area than the second upper region 41.

As in the non-limiting embodiment illustrated in FIG. 6, a boundary 47 between the first central region 31 and the first upper region 33 may be overlapped with the plane S as viewed from the side. The boundary 47 may be overlapped with the central axis O2 of the through hole 25 as viewed from the side. A boundary 49 between the second central region 39 and the second lower region 43 may be overlapped with the plane S as viewed from the side. The boundary 49 may be overlapped with the central axis O2 of the through hole 25 as viewed from the side.

The first lateral surface 19 may further include a first step part 51 located between the first region 27 and the first flank surface 37. The boundary 53 between the second central region 39 and the second upper region 41 may be adjacent to the first step part 51 in a direction orthogonal to the central axis O1.

The first lateral surface 19 may further include a second step part 55 located between the second region 29 and the second flank surface 45. The boundary 57 between the first central region 31 and the first lower region 35 may be adjacent to the second step part 55 in a direction orthogonal to the central axis O1.

For example, cemented carbide and cermet are usable as a material of the insert 1. Examples of composition of the cemented carbide may include WC—Co, WC—TiC—Co and WC—TiC—TaC—Co, in which WC, TiC and TaC may be hard particles and Co may be a binding phase.

The cermet may be a sintered composite material obtainable by compositing metal into a ceramic component. Examples of the cermet may include titanium compounds composed mainly of titanium carbide (TiC) or titanium nitride (TiN). Of course, it should be clear that the material of the insert 1 is not limited to the above compositions.

A surface of the insert 1 may be coated with a coating film by using chemical vapor deposition (CVD) method or physical vapor deposition (PVD) method. Examples of composition of the coating film may include titanium carbide (TiC), titanium nitride (TiN), titanium carbon nitride (TiCN) and alumina ($Al_2O_3$).

<Cutting Tools>

Figure 16:
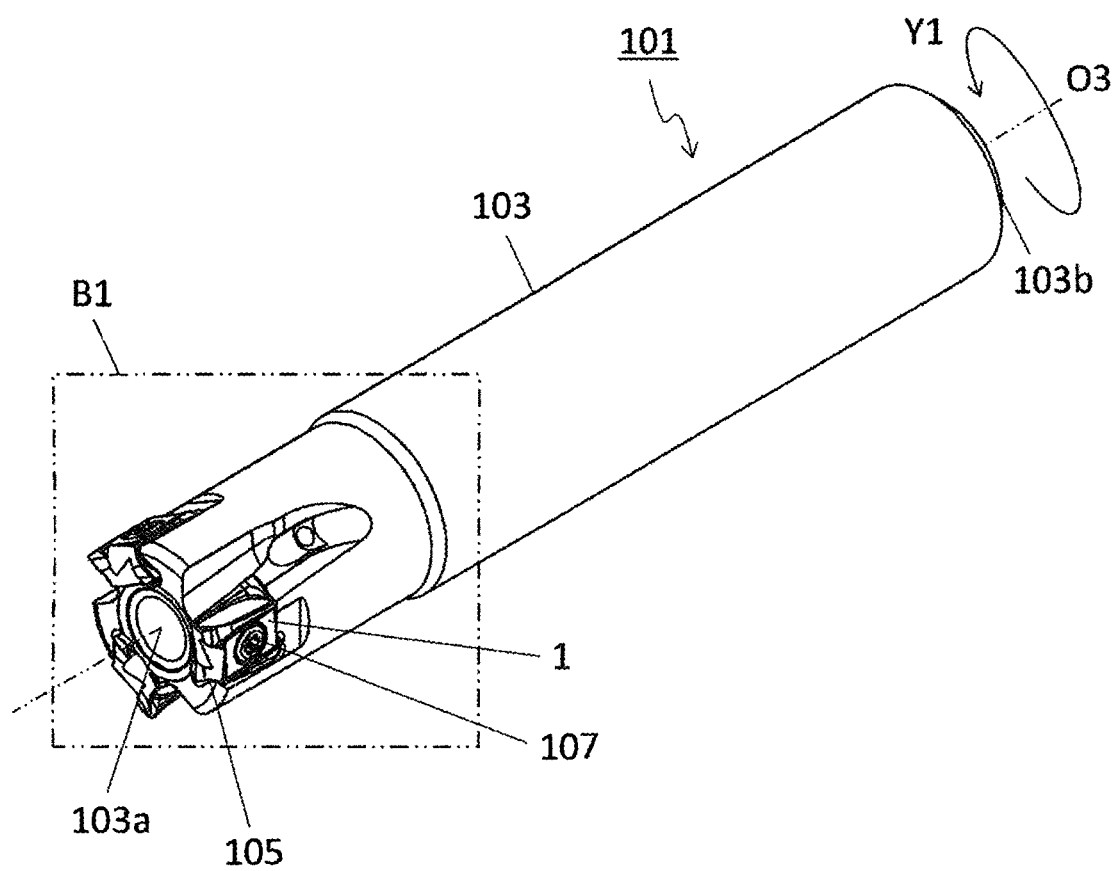
FIG. 16 is a perspective view illustrating a cutting tool in a non-limiting embodiment of the present disclosure.

A cutting tool 101 in a non-limiting embodiment of the present disclosure may be described below with reference to FIGS. 16 to 18. In FIG. 16 and the like, a rotation axis O3 of the cutting tool 101 may be indicated by a two-dot chain line, and a rotation direction of the rotation axis O3 may be indicated by an arrow Y1.

Figure 17:
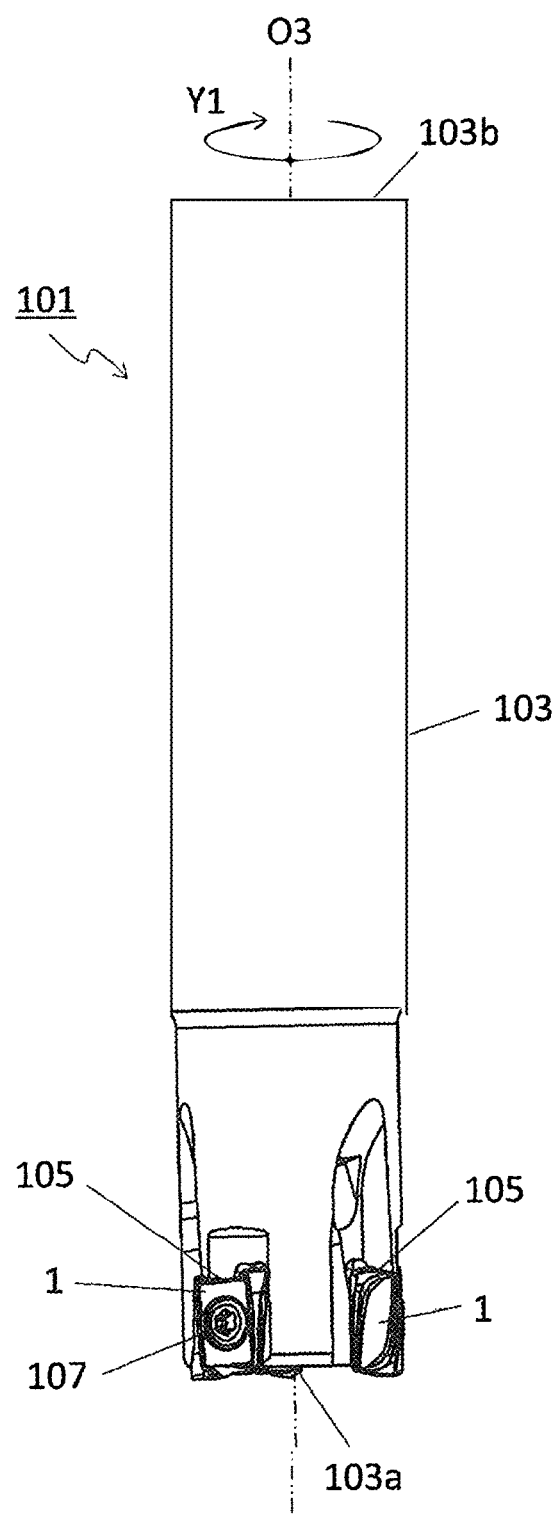
FIG. 17 is a side view of the cutting tool illustrated in FIG. 16.
Figure 18:
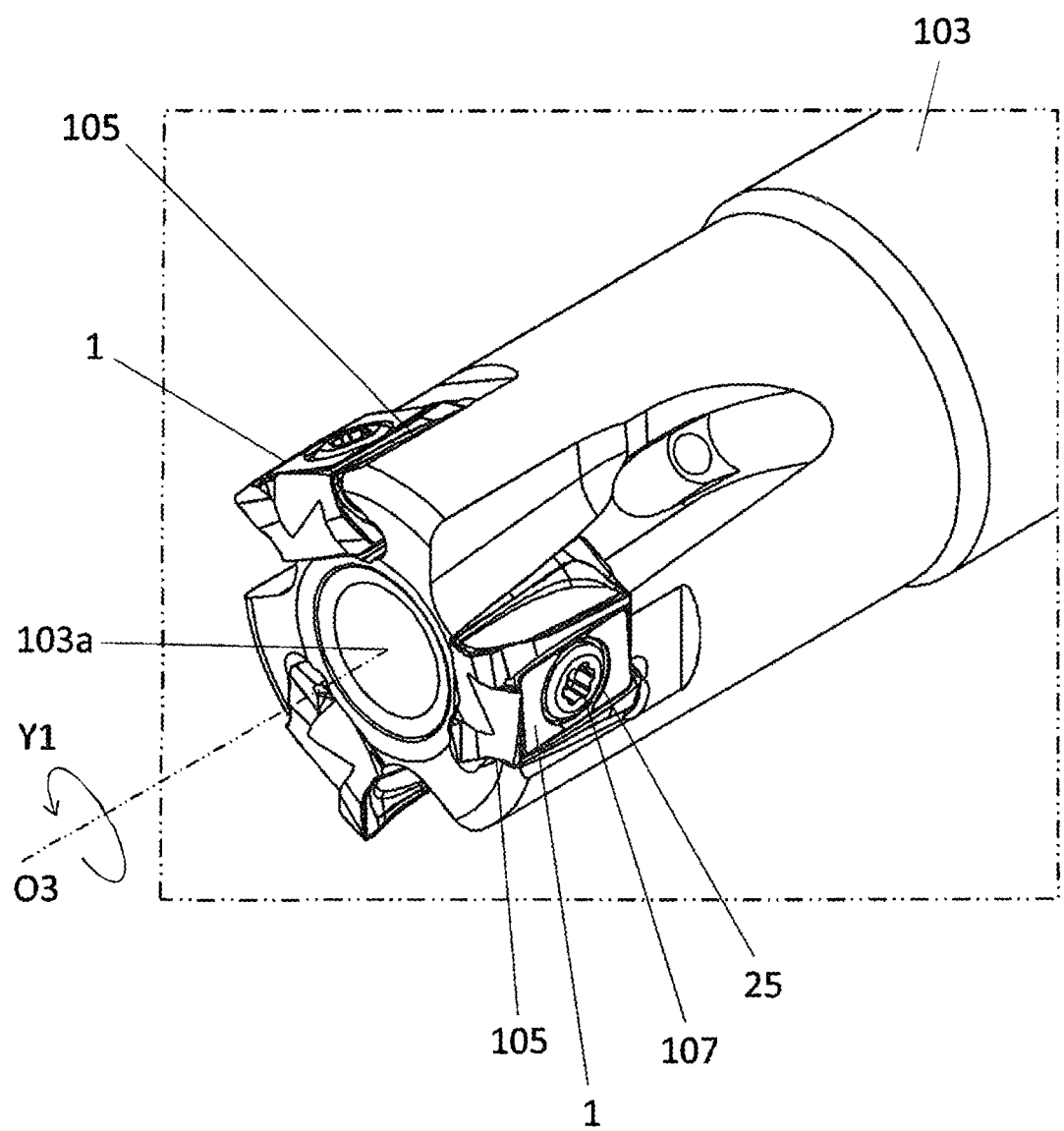
FIG. 18 is an enlarged view of a region B1 illustrated in FIG. 16.

The cutting tool 101 may include a holder 103 and the insert 1 as in the non-limiting embodiment illustrated in FIGS. 16 to 18. If the cutting tool 101 includes the insert 1, excellent cutting performance is attainable because of the stable fixing of the insert 1 to the holder 103.

The cutting tool 101 is rotatable around the rotation axis O3. The cutting tool 101 may be used for a milling process.

The holder 103 may have a columnar shape extended along the rotation axis O3 from a first end 103a to a second end 103b. The columnar shape may be an approximately columnar shape, but need not be a strict columnar shape.

The holder 103 may include a pocket 105 located on a side of the first end 103a. The insert 1 is attachable to the pocket 105. The pocket 105 may open into an outer peripheral surface of the holder 103 and an end surface on a side of the first end 103a.

The insert 1 may be located in the pocket 105. There may be one or a plurality of pockets 105. If the holder 103 includes the plurality of pockets 105, the cutting tool 101 may include a plurality of inserts 1, and the inserts 1 may be located one by one in the pockets 105.

In cases where the holder 103 includes the plurality of pockets 105, these pockets 105 may be located around the rotation axis O3 at equal intervals or unequal intervals.

The insert 1 may be fitted to the pocket 105 so that at least a part of the cutting edge can protrude from the holder 103. For example, the insert 1 may be attached to the holder 103 so that the upper cutting edge 9 can protrude from the holder 103 toward a workpiece. In this case, the lower surface 5 and the lateral surface 7 may be in contact with the holder 103.

The insert 1 may be fitted into the pocket 105 with a screw 107. Specifically, the insert 1 may be attached to the holder 103 by inserting the screw 107 into the through hole 25 of the insert 1, and by inserting a front end of the screw 107 into a screw hole formed in the pocket 105 so as to fix the screw 107 to the screw hole.

For example, steel and cast iron are usable as a material of the holder 103. If the material of the holder 103 is steel, the holder 103 may have high toughness.

<Methods for Manufacturing Machined Product>

A method for manufacturing a machined product 203 in a non-limiting embodiment of the present disclosure may be described below with reference to FIGS. 19 to 21.

The machined product 203 may be manufactured by carrying out a cutting process of a workpiece 201. The method for manufacturing the machined product 203 may include the following steps:

(1) rotating the cutting tool 101 represented by the above non-limiting embodiment;
(2) bringing the cutting tool 101 being rotated into contact with the workpiece 201; and
(3) moving the cutting tool 101 away from the workpiece 201.

Figure 19:
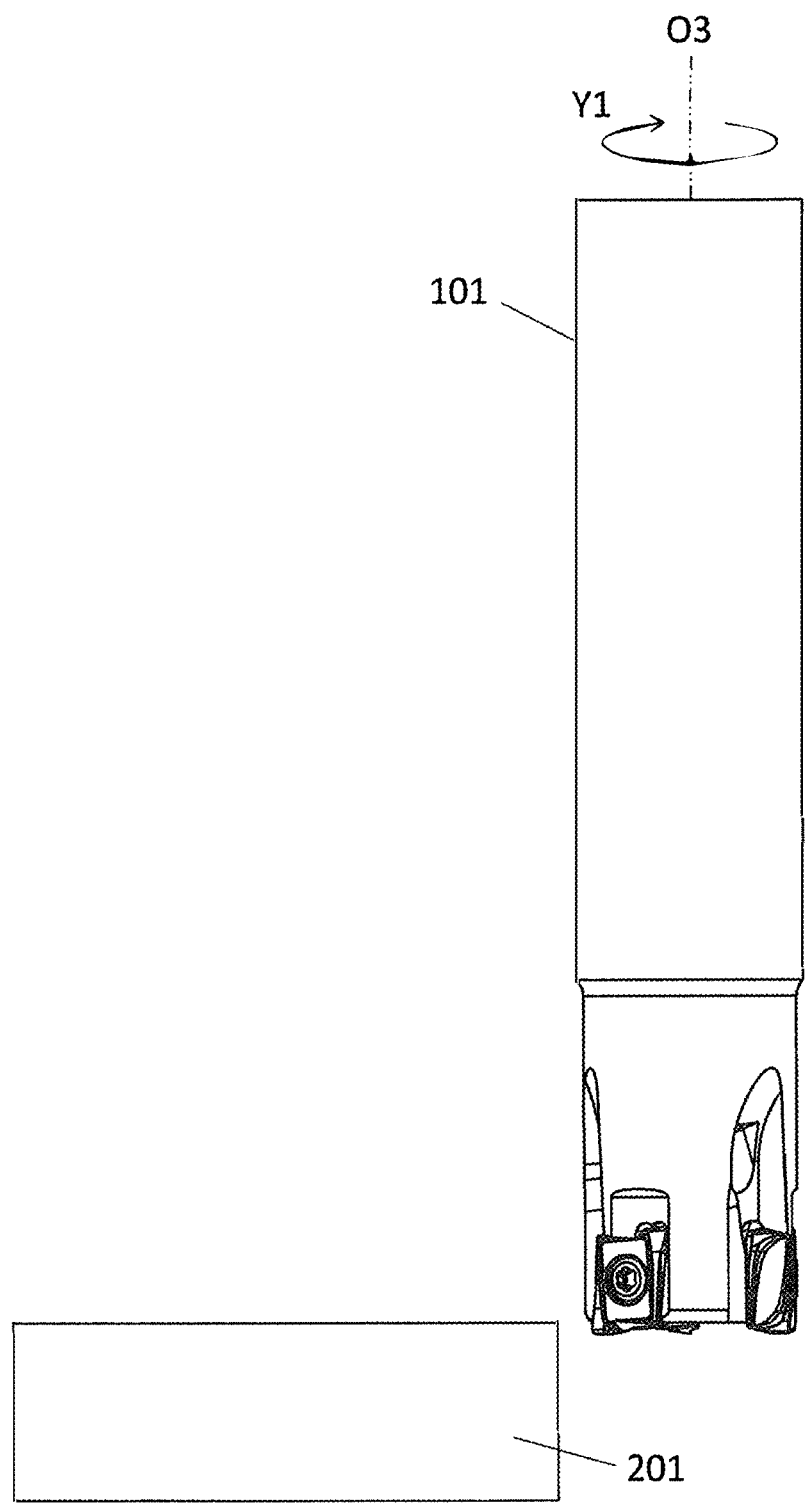
FIG. 19 is a schematic diagram illustrating one of steps in a method for manufacturing a machined product in a non-limiting embodiment of the present disclosure.

Specifically, firstly, the cutting tool 101 may be relatively brought near the workpiece 201 while rotating the cutting tool 101 around the rotation axis O3 in a Y1 direction as in the non-limiting embodiment illustrated in FIG. 19. Subsequently, the workpiece 201 may be cut out by bringing the upper cutting edge 9 of the cutting tool 101 into contact with the workpiece 201 as in the non-limiting embodiment illustrated in FIG. 20. Thereafter, the cutting tool 101 may be relatively moved away from the workpiece 201 as in the non-limiting embodiment illustrated in FIG. 21.

The machined product 203 having a highly precise finished surface is obtainable if going through the foregoing steps. Specifically, if the cutting tool 101 including the insert 1 is used in the method for manufacturing the machined product 203, the insert 1 can be stably fixed to the holder 103. It may therefore be possible to offer excellent machinability, thereby obtaining the machined product 203 having the highly precise finished surface.

Figure 20:
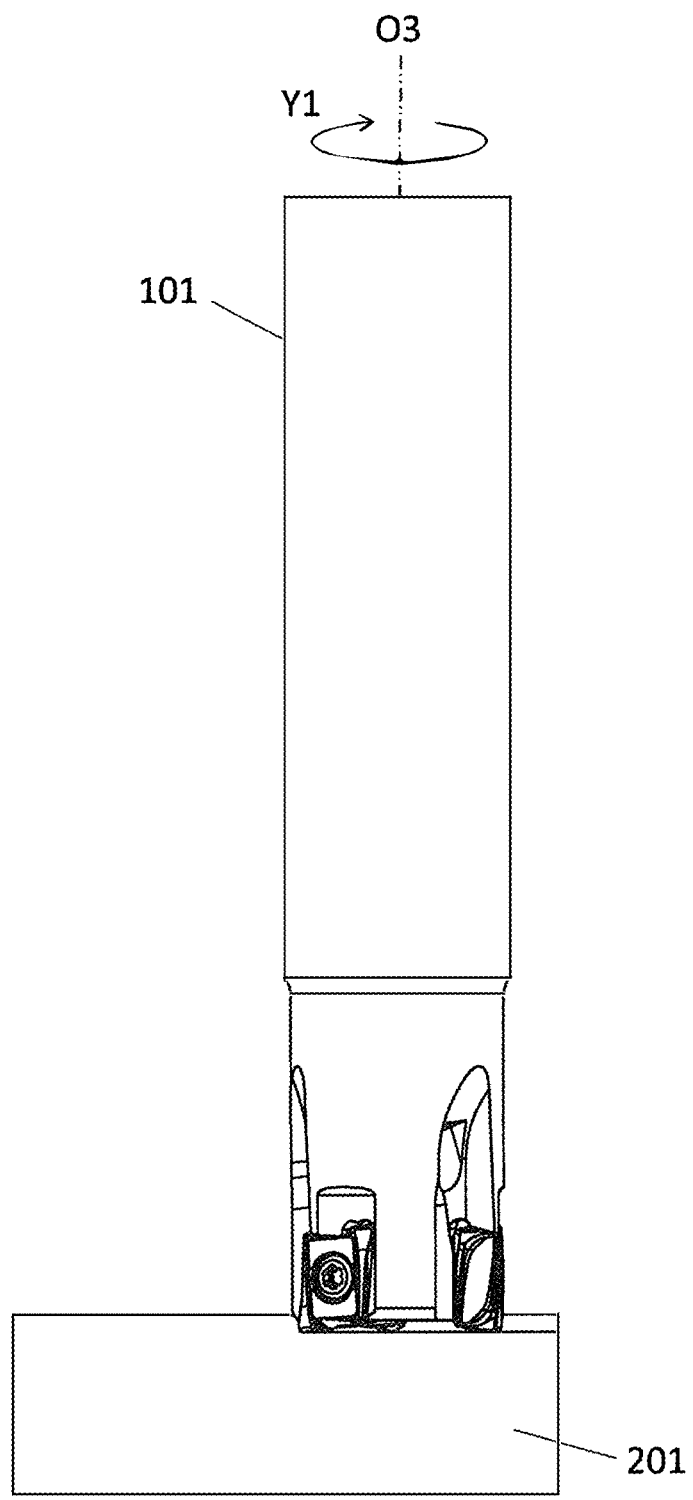
FIG. 20 is a schematic diagram illustrating one of the steps in the method for manufacturing a machined product in the non-limiting embodiment of the present disclosure.
Figure 21:
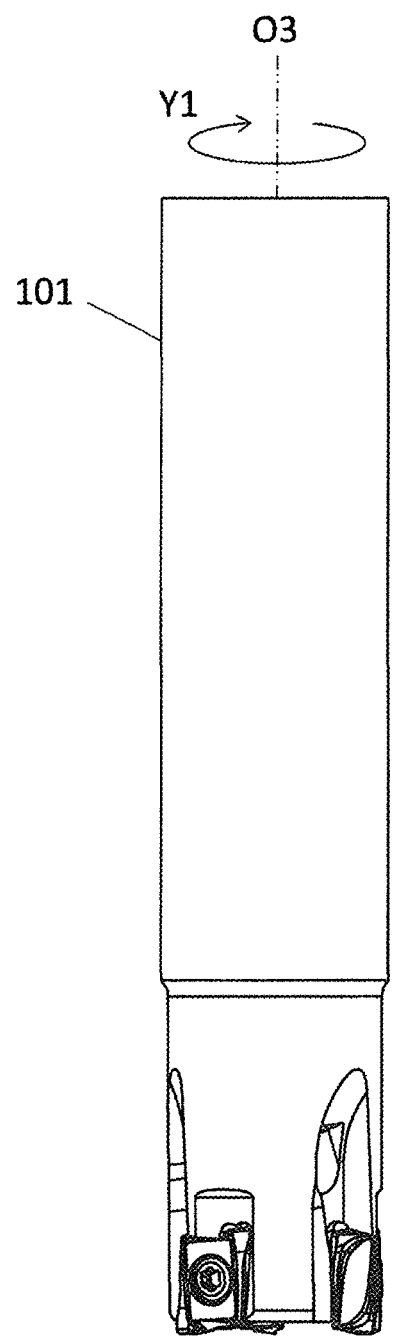
FIG. 21 is a schematic diagram illustrating one of the steps in the method for manufacturing a machined product in the non-limiting embodiment of the present disclosure.
Figure 21:
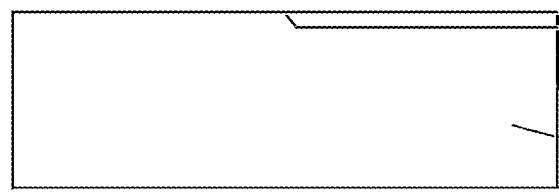

Although the workpiece 201 is fixed and the cutting tool 101 is moved in the individual steps in the non-limiting embodiment illustrated in FIGS. 19 to 21, of course, there is no intention to limit to this embodiment.

For example, the workpiece 201 may be brought near the cutting tool 101 in the step (1). Similarly, the workpiece 201 may be moved away from the cutting tool 101 in the step (3). If it is desired to continue the cutting process, the step of bringing the upper cutting edge 9 of the insert 1 into contact with different portions of the workpiece 201 may be repeated while keeping the cutting tool 101 rotated.

Examples of material of the workpiece 201 may include carbon steel, alloy steel, stainless steel, cast iron and non-ferrous metals.

The invention claimed is:

1. A cutting insert, comprising:
an upper surface having a polygonal shape and comprising a first side;
a lower surface located on a side opposite to the upper surface;
a lateral surface located between the upper surface and the lower surface;
an upper cutting edge located on an intersection of the upper surface and the lateral surface; and
a lower cutting edge located on an intersection of the lower surface and the lateral surface,
wherein
an imaginary straight line passing through a center of the upper surface and a center of the lower surface is a central axis,
the lateral surface comprises a first lateral surface located between the first side and the lower surface,
the first lateral surface has a convex shape in a cross section orthogonal to the central axis, and comprises
a first region that is flat, and
a second region that is flat and inclined relative to the first region, the first region comprises
a first central region,
a first upper region which is located closer to the upper surface than the first central region, and which has a larger width in a direction orthogonal to the central axis than the first central region, and
a first lower region which is located closer to the lower surface than the first central region, and which has a larger width in a direction orthogonal to the central axis than the first central region.

2. The cutting insert according to claim 1, wherein a maximum value of a width of the first upper region in a direction orthogonal to the central axis is larger than a maximum value of a width of the first lower region in a direction orthogonal to the central axis.

3. The cutting insert according to claim 1, wherein
the first lateral surface further comprises a first flank surface located between the first region and the upper surface, and
the first region is located closer to the central axis than the first flank surface in a cross section along the central axis.

4. The cutting insert according to claim 1, wherein the first region comes closer to the central axis as coming closer to the upper surface in a cross section along the central axis.

5. The cutting insert according to claim 1, wherein
the second region comprises
a second central region,
a second upper region which is located closer to the upper surface than the second central region, and which has a larger width in a direction orthogonal to the central axis than the second central region, and
a second lower region which is located closer to the lower surface than the second central region, and which has a larger width in a direction orthogonal to the central axis than the second central region.

6. The cutting insert according to claim 5, wherein a maximum value of a width of the second lower region in a direction orthogonal to the central axis is larger than a maximum value of a width of the second upper region in a direction orthogonal to the central axis.

7. The cutting insert according to claim 5, wherein
the first lateral surface further comprises a second flank surface located between the second region and the lower surface, and
the second region is located closer to the central axis than the second flank surface in a cross section along the central axis.

8. The cutting insert according to claim 5, wherein the second region comes closer to the central axis as coming closer to the lower surface in a cross section along the central axis.

9. The cutting insert according to claim 5, wherein the first upper region is adjacent to the second central region in a direction orthogonal to the central axis.

10. The cutting insert according to claim 5, wherein the second lower region is adjacent to the first central region in a direction orthogonal to the central axis.

11. The cutting insert according to claim 1, wherein
the first region comprises a first constraining surface configured to be in direct contact with an external holder, and
the second region comprises a second constraining surface configured to be in direct contact with the external holder.

12. The cutting insert according to claim 1, wherein
the upper surface further comprises:
  a second side adjacent to a first end portion of the first side, and
  a third side adjacent to a second end portion of the first side, wherein the second end portion is opposite the first end portion,
the lateral surface further comprises:
  a second lateral surface between the second side and the lower surface, and
  a third lateral surface between the third side and the lower surface, the third lateral surface being opposite to the second lateral surface,
an imaginary straight line passing through a center of the second lateral surface and a center of the third lateral surface is a lateral axis,
the first region is inclined away from the lateral axis in a direction away from the second lateral surface, and
the second region is inclined away from the lateral axis in a direction away from the third lateral surface.

13. The cutting insert according to claim 12, wherein a boundary between the first region and the second region is distal from the lateral axis at the first lateral surface in the cross section orthogonal to the central axis.

14. The cutting insert according to claim 1, wherein the first region is spaced from the upper surface.

15. The cutting insert according to claim 14, wherein the second region is spaced from the lower surface.

16. A cutting insert, comprising:
an upper surface having a polygonal shape and comprising a first side;
a lower surface on a side opposite to the upper surface;
a lateral surface between the upper surface and the lower surface;
an upper cutting edge on an intersection of the upper surface and the lateral surface; and
a lower cutting edge at an intersection of the lower surface and the lateral surface,
wherein
an imaginary straight line passing through a center of the upper surface and a center of the lower surface is a central axis,
the lateral surface comprises a first lateral surface located between the first side and the lower surface,
the first lateral surface has a convex shape in a cross section orthogonal to the central axis, and comprises
a first region that is flat, and
a second region that is flat and inclined relative to the first region, the first region comprises:
  a first upper region, wherein a width of the first upper region in a direction orthogonal to the central axis increases in a direction toward the upper surface, and
  a first lower region is closer to the lower surface than the first upper region, wherein a width of the first lower region in a direction orthogonal to the central axis increases in a direction toward the lower surface.

17. A cutting tool, comprising:
a holder having a columnar shape extended along a rotation axis from a first end to a second end, the holder comprising a pocket on a side of the first end; and
a cutting insert at the pocket, wherein
the cutting insert comprises:
  an upper surface having a polygonal shape and comprising a first side;
  a lower surface on a side opposite to the upper surface;
  a lateral surface between the upper surface and the lower surface;
  an upper cutting edge at an intersection of the upper surface and the lateral surface; and
  a lower cutting edge at an intersection of the lower surface and the lateral surface, wherein
an imaginary straight line passing through a center of the upper surface and a center of the lower surface is a central axis,
the lateral surface comprises a first lateral surface located between the first side and the lower surface,
the first lateral surface has a convex shape in a cross section orthogonal to the central axis, and comprises:
  a first region that is flat and in direct contact with the pocket, and
  a second region that is flat and inclined relative to the first region, the second region being in direct contact with the pocket,
the first region comprises:
  a first central region,
  a first upper region which is closer to the upper surface than the first central region, and the first upper region has a larger width in a direction orthogonal to the central axis than the first central region, and
  a first lower region which is closer to the lower surface than the first central region, and the first lower region has a larger width in a direction orthogonal to the central axis than the first central region.

* * * * *